United States Patent Office 2,974,133
Patented Mar. 7, 1961

2,974,133

CATALYST OF HEAVY METAL COMPOUND AND POLYSILOXANE AND USE THEREOF IN OLEFIN POLYMERIZATION

Egon Wiberg and Robert Hartwimmer, Munich, Germany, assignors to Farbwerke Hoechst Aktiengesellschaft vormals Meister Lucius & Brüning, Frankfurt am Main, Germany, a corporation of Germany No Drawing. Filed Feb. 25, 1959, Ser. No. 795,368

12 Claims. (Cl. 260—94.9)

The present invention provides a process and catalysts for the manufacture of olefin polymers.

It is known to convert ethylene or alpha-olefins in the presence of catalysts prepared from compounds of the metals of sub-groups IV to VI of the periodic table and organometal compounds into polyolefins of high molecular weight which may be used as artificial materials. As organo-metal compounds suitable for use in the aforesaid process there have been proposed alkyls of the alkali metals, alkaline earth metals and earth metals, especially those of aluminum. It has also been proposed to use alkyl compounds of metals of main-group IV of the periodic table, for example tetraethyl lead, tetraethyl tin or hexaethyl distannoxane. The use of the last-mentioned group of compounds has been proposed because these compounds can more easily be treated than aluminum alkyls, since they are insensitive to moisture and oxygen. The application of the aforesaid metal alkyl compounds in practice has, however, the drawback that these compounds as well as the portions of the catalyst remaining in the polymer have a high degree of toxicity.

U.S. patent application Serial No. 748,136, filed on July 14, 1958, in the name of Egon Wiberg et al. for "Process for Polymerizing Lower Olefins," provides a process for polymerizing lower olefins containing up to 12 carbon atoms, wherein there is used as catalyst a reaction product of a compound of an element of sub-groups I to VIII of the periodic table, inclusive, the compounds of the rare earth metals, with a hydrogen silicide and/or a derivative thereof containing halogen, oxygen or nitrogen.

Now we have found that ethylene and/or alpha-olefins can be converted into polyofins of high molecular weight which may be used as artificial materials by treating them in the presence of a catalyst of a compound of a metal of sub-groups IV to VI of the periodic table and a polysiloxane of the general formula

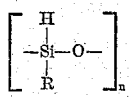

In the aforesaid formula R stands for an alkyl, an aryl or an aralkyl radical, for example a methyl, ethyl, n-propyl, isopropyl, butyl, phenyl or benzyl radical. n is an integer within the range of 2 to about 100, preferably 2 to 30. As far as the compounds corresponding to the formula are not cyclic polymers the free terminal valencies of Si may be saturated by H, OH, Cl or OR, those of O by H or R or in a different manner. The metals of sub-group IV of the periodic table are titanium, zirconium, hafnium and thorium; the metals of sub-group V are vanadium, niobium, and tantalum; and sub-group VI covers chromium, molybdenum, tungsten and uranium.

The treatment of the polysiloxanes of the aforesaid composition which are used according to the invention does not involve any danger, and is easy. Methyl hydride polysiloxane, for example, which can easily be prepared from methyl-dichlorosilane by way of hydrolysis is, depending on its molecular weight, a more or less viscous liquid which readily dissolves in the usual solvents and which is altogether insensitive to the influence of air and moisture (cf. S. Nitzsche and M. Wick, Zeitschrift für Angewandte Chemie 69 (1957) 96).

The polysiloxanes to be used according to the invention are advantageously soluble in the solvents usually used as dispersing agents for the polymerization. Whether or not they possess this property can be ascertained by a simple small-scale test.

The polysiloxanes are used together with compounds of metals of sub-groups IV to VI of the periodic table, the chlorides, oxychlorides and bromides of titanium and vanadium being particularly suitable. The results obtained by the use of mixtures of organic hydrogen polysiloxanes with organic derivatives of titanium or vanadium such as the acetyl acetonates or the dicyclopentadienyl compounds, or the corresponding compounds of chromium or zirconium are not quite so favorable. The metal of the metal compounds may have the highest valency or also a lower valency.

The polymerization of ethylene and alpha-olefins in the presence of the above-mentioned catalyst is preferably carried out in an inert solvent. Suitable inert solvents are saturated hydrocarbons such as pentane, heptane, methyl-cyclohexane and commercial gasoline or kerosene fractions and aromatic hydrocarbons such as benzene, toluene and xylene.

When suitable conditions are applied the polymerization is carried out without application of excess pressure. In order to increase the rate of polymerization it is, however, suitable to apply an elevated pressure of up to about 100 atmospheres or more. The temperature of polymerization is in general within the range of room temperature to 150° C. Lower or higher temperatures may, however, also be applied.

The hydrogen polysiloxane and the metal compound may be used in a proportion varying within wide limits. The components are preferably applied in a molar ratio within the range of 1:1 to 2:1. By one mol of hydrogen polysiloxane there is here to be understood one mol of the grouping —RHSiO—. In principle it is, however, possible to apply a still larger or even a smaller quantity of hydrogen polysiloxane.

A preferred method of operating according to the invention consists, for example, in heating the catalyst components in one of the above-mentioned solvents for a short time to a temperature of 100° C. or more, the heat treatment being first carried out in the absence of the olefin, until reaction sets in. The reaction probably brings about a reduction of the metal compound. Subsequently the olefin is allowed to act upon the reaction mixture of the catalysts. The polymerization then proceeds at temperatures below 100° C. and it may be carried out for many hours at the same rate.

The process may be modified in the following way: The catalyst components are preferably mixed in one of the above-mentioned solvents under an inert gas atmosphere, the molar ratio of hydrogen polysiloxane to heavy metal halide being within the range of 1:1 to 2:1. When carried out at room temperature, the reaction resulting in the formation of heavy metal halides of low valencies proceeds in general slowly and takes several days. When the reaction mixture is heated, for example to temperatures within the range of 70 to 120° C., the reduction can be brought about in a few hours. In this case the heavy metal halide of low valency is obtained in a finely divided form which is catalytically particularly effective. The halide can easily be freed from the other reaction products by a washing with an inert solvent. If ethylene is to be polymerized the heavy metal catalyst that has thus been prepared is suspended in one of the above-mentioned solvents which has previously been freed from air and saturated with ethylene. After addition of a small amount of hydrogen polysiloxane the absorption of ethylene sets in with the formation of solid polyethylene of high molecular weight. It is advisable to add, if desired, further dosed quantities of hydrogen polysiloxane in addition to ethylene in the course of the polymerization. In the polymerization process the molar ratio of the reduced heavy metal compound to polysiloxane may vary within wide limits, for example within the range of 100:1 to 1:100. The temperatures and pressures applied during the polymerization are the same as those mentioned above.

The olefin polymer is obtained as a pasty or fibrous mass which is freed from the catalysts by a known method, for example a treatment with alcohols or a washing with water, an organic solvent or an aqueous solution of an acid or an alkali.

It is remarkable that the aspect of the polymers obtained by the use of vanadium compounds as heavy metal component differs considerably from that of the products obtained by the use of titanium compounds as cocatalysts. The fibrous structure can clearly be distinguished in all parts of the first-mentioned group of polymers. Long filaments are arranged in rows and grown together in a longitudinal direction. Individual filaments having a length of several centimeters can be drawn off from the fragments of the polymer block. With respect to their structural shape the fragments are very similar to the lumps of the "fibrous serpentine-stone" or "fibrous asbestos," to apply known comparisons.

The following examples serve to illustrate the invention but they are not intended to limit it thereto.

Example 1

250 cc. of a kerosene fraction boiling between 200 and 230° C. and 5 cc. of methyl hydride polysiloxane ($n$=about 30 to 40) were introduced into a low pressure vessel provided with a stirring means and a device for automatic temperature regulation and having a capacity of 0.5 liter. The reaction chamber was rinsed well and enveloped with nitrogen. Then 4.4 cc. of $TiCl_4$ were quickly introduced by means of a pipette and the pressure vessel was closed. The mixture was stirred and heated for 3 to 4 hours at 110° C., no ethylene being introduced. After the heating, the pressure in the pressure vessel was released and the reaction vessel was cooled to 60° C. Then ethylene was introduced under a pressure of 30 to 40 atmospheres gage and by the drop in pressure the constant, uniform absorption of ethylene by the catalyst mixture could be observed. After 20 hours the experiment was terminated, the pressure vessel opened and the reaction mixture which contained a large proportion of polymer was washed out by means of the above-mentioned kerosene fraction. The pasty mass thus obtained was decomposed by means of n-butanol, the polymer was filtered off with suction and thus separated from the solution and subsequently it was purified with an alcoholic solution of KOH. The polymer which at this stage of the experiment was white was filtered off with suction, washed once more with a solution of methanol and HCl and then dried at 95° C. 78 grams of a pure white, pulverulent polymer were obtained.

Example 2

A mixture of 300 cc. of the kerosene mentioned in Example 1 and 6 cc. of methyl hydride polysiloxane was introduced into a low pressure vessel provided with a stirring means and a device for automatic temperature regulation and having a capacity of 0.5 liter. The pressure vessel was rinsed well with nitrogen. Shortly before the pressure vessel was closed 7 cc. of titanium tetrachloride were added to the mixture. The reaction mixture was then heated at 120° C. while being stirred continuously, no ethylene being introduced. After 100 minutes the pressure in the pressure vessel (about 0.5 to 1.5 atmospheres gage) was released and the temperature in the reaction chamber was diminished to 60° C. After mounting the high pressure pipings ethylene was brought into contact with the catalyst mixture under a pressure of 40 atmospheres gage, the introduction of ethylene from the tank being constantly maintained. After 8 hours, in the course of which the whole was continuously stirred and the temperature maintained at 60 to 70° C., the experiment had to be interrupted and the pressure vessel to be opened because the large quantity of polymer that had formed and which practically filled out the whole of the reaction chamber had clogged the nozzles through which the gas entered. The polymer cake was taken up with fresh kerosene, decomposed with n-butanol, subsequently filtered off and taken up with alcoholic KOH and heated to 60 to 70° C. while stirring vigorously. The product which had thus been purified was again filtered off with suction, washed for a short time with methanol and dried at 95° C. 138 grams of polymer were obtained in the form of a pure white, gritty powder.

Example 3

250 cc. of the kerosene mentioned in Example 1, 8 cc. of methyl hydride polysiloxane and 8.6 grams of vanadium oxy-tri-chloride were introduced one after the other into a 0.5 liter pressure vessel which was provided with a stirring means and a device for automatic temperature regulation. The pressure vessel was closed and the air was expelled by several times introducing nitrogen under pressure into, and removing it from, the pressure vessel. The reaction mixture was then heated to 120° C. and vigorously stirred. After two hours the slight excess pressure prevailing in the pressure vessel was released and after the temperature in the interior of the pressure vessel had dropped to 70° C. the introduction of ethylene under pressure was begun. After ethylene had been introduced under a pressure of approximately 35 atmospheres gage the catalyst mixture absorbed, on an average, 10 to 20 liters of ethylene per hour. After altogether 11 hours it was no longer possible to stir and when the pressure vessel was opened the total quantity of the polymer could be lifted out of the pressure vessel in the form of a solid block that had formed all around the stirring device. The polymer block was disintegrated and treated with butanol and butanolic KOH solution in order to be freed from the catalyst. The product was subsequently boiled with benzene, washed and dried at 95° C. The yield amounted to 194 grams. The product thus obtained was pure white and long-fibered.

Example 4

A mixture of 250 cc. of the kerosene mentioned in Example 1 and 4 cc. of methyl hydride polysiloxane was introduced into a 0.5 liter pressure vessel and 4 grams of vanadium oxy-tri-chloride were added. The reaction chamber was enveloped with nitrogen and the catalyst mixture that had just been introduced was heated separately for 2½ hours at 130° C. During the heating it was constantly stirred. After the pressure prevailing in the pressure vessel had been released and the latter cooled to 60° C. ethylene was introduced under a pressure of 30 atmospheres gage and the adsorption of gas which set in immediately was constantly observed by the drop in pressure. As soon as necessary the pressure of ethylene was again increased from time to time to 30 atmospheres gage. After 15 hours' stirring the experiment was terminated although the catalyst exhibited an undiminished absorbing power. The reaction space of the pressure vessel was full of a dense filamentary polymer product. It was, as in the preceding examples, treated with butanol, purified, worked up and dried.

The yield amounted to 179 grams. The product was pure white.

We claim:

1. A process for the manufacture of polymers of normally gaseous alpha-olefins which comprises contacting at least one of said alpha-olefins with a catalyst system consisting essentially of a reaction product of (1) a compound selected from the group consisting of the chlorides, oxychlorides, bromides, acetylacetonates, and dicyclopentadienyl compounds of the metals titanium, vanadium, chromium, and zirconium, and (2) a polysiloxane of the general formula

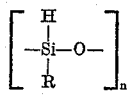

wherein R is a member selected from the group consisting of an alkyl radical, an aryl radical and an aralkyl radical and $n$ is an integer from 2 to about 100, the reaction of these products being carried out by heating them in an inert hydrocarbon to a temperature in the range between 20 and 150° C. until a slurry is formed; and subsequently separating the polymer product.

2. The process of claim 1, wherein the metal compound is titanium chloride.

3. The process of claim 1, wherein the metal compound is a vanadium oxychloride.

4. The process of claim 1, wherein polysiloxane has the formula

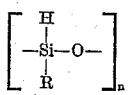

5. The process of claim 1, wherein ethylene is polymerized.

6. A catalyst system for the polymerization of normally gaseous alpha-monoolefins consisting essentially of (1) a compound selected from the group consisting of the chlorides, oxychlorides, bromides, acetylacetonates, and dicyclopentadienyl compounds of the metals titanium, vanadium, chromium, and zirconium, and (2) a polysiloxane of the general formula

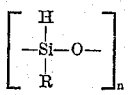

wherein R is a member selected from the group consisting of an alkyl radical, an aryl radical and an aralkyl radical and $n$ is an integer from 2 to about 100, this mixture being heated in an inert hydrocarbon to a temperature of 20–150° C. until a slurry is formed.

7. A catalyst system for the polymerization of normally gaseous alpha-monoolefins consisting essentially of (1) titanium chloride and (2) methyl hydrogen polysiloxane.

8. A catalyst system for the polymerization of normally gaseous alpha-monoolefins consisting essentially of vanadium oxychloride and methyl hydrogen polysiloxane.

9. A process for the polymerization of olefins which comprises reacting in an inert hydrocarbon (1) a compound selected from the group consisting of the chlorides, oxychlorides, bromides, acetylacetonates, and dicyclopentadienyl compounds of the metals titanium, vanadium, chromium, and zirconium, and (2) a polysiloxane of the general formula

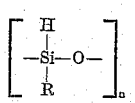

wherein R is a member selected from the group consisting of an alkyl radical, an aryl radical and an aralkyl radical and $n$ is an integer from 2 to about 100 at a temperature above 100° C. to form a catalyst suspension; introducing ethylene into the said catalyst suspension at a temperature between 0 and 100° C. at an elevated pressure up to 100 atmospheres; and subsequently separating the polymer product.

10. A process for the polymerization of olefins which comprises reacting in an inert hydrocarbon (1) a compound selected from the group consisting of the chlorides, oxychlorides, bromides, acetylacetonates, and dicyclopentadienyl compounds of the metals titanium, vanadium, chromium, and zirconium, and (2) a polysiloxane of the general formula

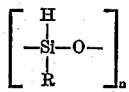

wherein R is a member selected from the group consisting of an alkyl radical, an aryl radical and an aralkyl radical and $n$ is an integer from 2 to about 100 at a temperature between room temperature and 120° C.; separating the solid product formed by said reaction; suspending the separated product in an inert hydrocarbon which has formerly been saturated with ethylene; adding to the suspension a small amount of a polysiloxane (2); and performing the polymerization by further addition of ethylene and polysiloxane; and finally separating the polymer product.

11. A process for the manufacture of olefin polymers which comprises contacting a normally gaseous monoolefin with a catalyst system consisting of (1) a compound selected from the group consisting of the chlorides, oxychlorides, bromides, acetylacetonates, and dicyclopentadienyl compounds of the metals titanium, vanadium, chromium, and zirconium, and (2) a polysiloxane of the general formula

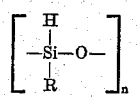

wherein R is a member selected from the group consisting of an alkyl radical, an aryl radical and an aralkyl radical and $n$ is an integer from 2 to about 100, said catalyst system being employed in the form of a suspension in an inert hydrocarbon; introducing said gaseous monoolefin into said catalyst suspension at a temperature of 20–150° C., and subsequently separating the polymer product.

12. A process for the manufacture of polymers of normally gaseous alpha-olefins which comprises contacting at least one of said alpha-olefins with a catalyst system consisting essentially of a reaction product of (1) a compound selected from the group consisting of the chlorides, oxychlorides, bromides, acetylacetonates, and dicyclopentadienyl compounds of the metals titanium, vanadium, chromium, and zirconium, and (2) a polysiloxane of the general formula

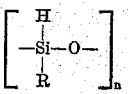

wherein R is a member selected from the group consisting of an alkyl radical, an aryl radical and an aralkyl radical and $n$ is an integer from 2 to about 100, the reaction of these products being carried out by heating them in an inert hydrocarbon to a temperature in the range between 20 and 150° C. until a slurry is formed; and subsequently separating the polymer product.

References Cited in the file of this patent

UNITED STATES PATENTS

| 2,716,128 | West | Aug. 23, 1955 |

FOREIGN PATENTS

| 569,387 | Belgium | Jan. 1959 |
| 573,649 | Belgium | Mar. 31, 1959 |

Notice of Adverse Decision in Interference

In Interference No. 92,969 involving Patent No. 2,974,133, E. Wiberg and R. Hartwimmer, Catalyst of heavy metal compound and polysiloxane and use thereof in olefin polymerization, final judgment adverse to the patentees was rendered May 13, 1964, as to claims 1, 3, 4, 5, 6, 8, 9, 11 and 12.

[*Official Gazette August 25, 1964.*]